Aug. 22, 1967 P. M. KENDIG ETAL 3,337,843
UNDERWATER TRANSDUCER ARRAY FOR DEEP SUBMERGENCE
Filed Dec. 20, 1965
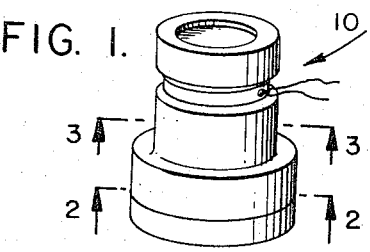
FIG. 1.
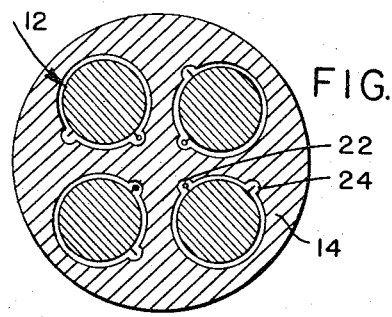
FIG. 3.
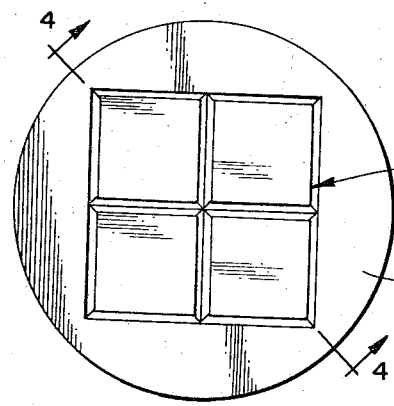
FIG. 2.
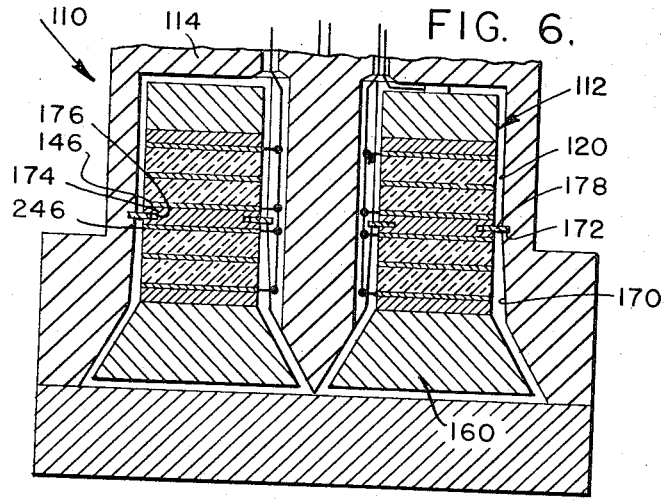
FIG. 4.
FIG. 6.
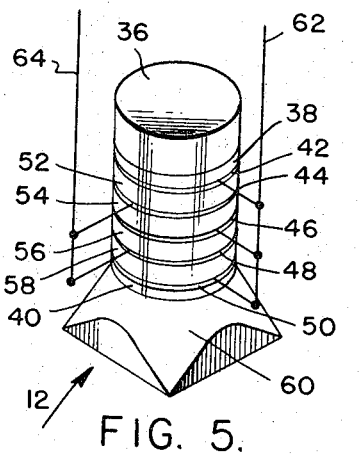
FIG. 5.
INVENTORS.
PAUL M. KENDIG
HUGH J. CLARKE
BY
V. C. MULLER
ATTORNEY.

United States Patent Office 3,337,843
Patented Aug. 22, 1967

3,337,843
UNDERWATER TRANSDUCER ARRAY FOR
DEEP SUBMERGENCE
Paul M. Kendig and Hugh J. Clarke, State College, Pa., assignors, by mesne assignments, to the United States of America as represented by the Secretary of the Navy
Filed Dec. 20, 1965, Ser. No. 515,256
10 Claims. (Cl. 340—8)

ABSTRACT OF THE DISCLOSURE

Electroacoustic transducer apparatus including four piezoelectric transducer units carried within close fitting, unit receiving cavities formed in a steel housing. The housing includes formed therein a liquid-receiving reservoir and small conduits extending therefrom to each of the unit receiving cavities.

---

The present invention relates to an array of electroacoustic sound transducers which is particularly useful as a sound projector or as a hydrophone at high hydrostatic pressures, including those pressures and temperatures at the deepest known points in the ocean.

Analogous pressure and temperature stable transducer arrays developed prior to the conception of the invention to be described herein have either utilized liquid-filled housings for pressure compensation; or pressure relief materials at one end of each individual transducer unit. Arrays utilizing pressure relief materials have been limited in their application by distortion in operating characteristics at elevated hydrostatic pressures. Arrays utilizing liquid-filled housings have been found to have undesirable operating limitations due to substantial interaction of vibrations in the liquid within the housing.

The invention is directed to the problem of eliminating the objectionable variations in operating characteristics of liquid-filled transducer arrays, by eliminating all pressure relief materials in mounting the transducer units within the encapsulating housing, and more specifically, to the elimination of undesirable interactions between separate transducer units of an array by recessing each transducer unit within a massive housing of high $\rho c$ material, and thereby eliminating the large volume of liquid conventionally positioned between individual transducer units of a liquid-filled array. By eliminating most of the liquid and substantially isolating each liquid-surrounded transducer, objectionable standing-wave effects and reflections are either eliminated or reduced to an operationally acceptable minimum.

An object of the present invention is to provide a liquid-filled transducer array for underwater sound systems wherein hydrostatic pressures will be compensated without the use of pressure-relief mounting materials.

Another object of the invention is to eliminate or minimize the reflection and standing-wave effects, undesirable characteristics inherent in the use of prior art liquid-filled arrays.

A further object of the invention is to facilitate the assembly of acoustic arrays by the use of a simplified nodal mounting for the individual transducer units thereof.

Other objects, advantages and novel features of the invention will become apparent from the following detailed description of the invention when considered in conjunction with the accompanying drawings wherein:

FIG. 1 shows a prespective view of the transducer array incorporating the features of the invention;

FIG. 2 is a bottom plan view of the array taken along lines 2—2 of FIG. 1;

FIG. 3 is a cross-sectional view of the array taken along lines 3—3 of FIG. 1;

FIG. 4 is a cross-sectional view of the array taken along lines 4—4 of FIG. 2;

FIG. 5 is a perspective view of an individual transducer unit of the array; and

FIG. 6 is a cross-sectional view of an alternative embodiment of the array, illustrating the nodal mounting of the individual transducer units.

Referring now to the drawings and FIG. 1 in particular, there is shown an array 10 of the type constituting the subject invention. FIG. 2 shows the orientation of the individual transducer units 12 of array 10, this view being taken at the surface where acoustic window 32 and housing 14 are joined. FIG. 3 shows the orientation of holes 22 and grooves 24 utilized to pass the lead wires 62 and 64 from transducer units 12 to reservoir portion 18 of housing 14 and to provide the conduit means for supplying liquid to forward portion 16 of housing 14.

Referring to FIG. 4, the central cross-sectional view of the array 10, shows massive housing 14 formed of high specific acoustic impedance ($\rho c$) material such as steel. Housing 14 has a forward portion 16 and a reservoir portion 18 and is generally cylindrical in shape, as best seen in FIG. 1. Within the forward portion 16 of housing 14 are a plurality of transducer cavities 20 shaped to closely follow the configuration of transducer unit 12 to be assembled therewithin. A plurality of small holes 22 are drilled through housing 14 to connect each cavity 20 with reservoir portion 18; to permit the flow of liquid therethrough; and to permit the passage of connecting wires to the reservoir portion 18. Two larger diameter holes or grooves 24 are drilled along the periphery of each transducer cavity 20 to permit the recessing of lead wires 62 and 64 therewithin. It will be understood that holes 22 and grooves 24 act as a means for connecting forward portion 16 with reservoir portion 18 and will function as a low-pass acoustic filter when filled with liquid. Reservoir portion 18 of housing 14 is externally threaded at 26 to facilitate the joining of a resilient element 28 thereto by an internally threaded cap ring 30. Ring 30, element 28, and reservoir portion 18 of housing 14 form a liquid impervious reservoir for the retention of liquid. At the forward portion 16 of housing 14, a resilient acoustic window 32 is bonded at 34 to provide a liquid impervious seal therebetween. This window may be formed of $\rho c$ rubber or any other material which will function as an acoustic window. Electroacoustic transducer units 12 are bonded to the inner surface of window 32, and, as will be apparent, are entirely supported by this bonding to the acoustic window, thereby eliminating all pressure relief mounting materials commonly utilized at the rear of transducer assemblies.

Referring now to FIGS. 4 and 5, each transducer unit 12 includes tail mass 36 formed of brass, insulating wafers 38 and 40 formed of steatite, dimpled steel electrodes 42, 44, 46, 48, and 50, lead zirconate titanate transducer wafers 52, 54, 56, and 58 polarized to provide poles of opposite polarity at their respective electrodes and oriented alternately to provide three electrodes of one polarity and two of opposite polarity, forward head portion 60 formed of magnesium, and lead wires 62 and 64 extending therefrom electrically connected to electrodes 42, 46, and 50 and electrodes 44 and 48 respectively, all bonded together in a unitary assembly as is conventional in the transducer art. Each lead wire 62 and 64 extends along its associated transducer unit 12 recessed within grooves 24 provided therefor, and then both lead wires are passed through hole 22 to reservoir portion 18 of housing 14 where they are electrically joined to the lead wires of similar polarity from the other transducer units 12 and then passed to the outside of housing 14 through a liquid impervious plug 66 threaded into a hole in reservoir portion 18 of housing 14. On the side of reservoir portion 18 opposite to plug 66 another plug 68 is threaded into another hole in reservoir portion 18 of housing 14 and is utilized to fill all voids within housing 14 after the complete assembly of array 10.

It should be noted that transducer cavities 20 are shaped to conform to the geometric outline of transducer units 12 leaving only a minimal operative clearance at all points therebetween. It will be understood that the term "minimal operative clearance" as utilized herein shall mean the clearance which will provide sufficient liquid volume surrounding transducer units 12 to permit their normal assembly into array 10; which will permit transducer units 12 to vibrate without touching housing 14 at any time during the operation of array 10; and which will permit the operation of array 10 at extreme temperature and hydrostatic pressure ranges, and yet minimize the liquid volume surrounding transducer units 12. For a transducer unit 12 having a 1.00 inch diameter rear portion and a 1.30 inch square forward face, 0.062 inch minimal operative clearance has been proven to be satisfactory. Further, if liquid is to be available to flow between reservoir portion 18 and transducer cavities 20 in forward portion 16 of housing 14, the internal volume of reservoir portion 18 filled with liquid must be sufficient to supply liquid to the liquid volume portion of forward portion 16 under extreme temperature and hydrostatic pressure vibrations.

Referring now to FIG. 6, a second embodiment of the invention is shown, array 110, analogous to the embodiment shown in FIGS. 1 to 5, but with transducer units 112 provided with a nodal mounting means and with transducer cavities 120 modified to provide nodal mounting to housing 114. All elements not separately identified are common to both the embodiments of FIGS. 1 to 5 and FIG. 6. Housing 114 is similar in all respects to housing 14 except for the provision of an additional tapered forward portion 170 and an annular recess 172 in each transducer cavity. Transducer units 112 are similar to transducer units 12 except for the substitution of two electrodes 146 and 246 and nodal mounting wafer 174 in place of central electrode 46, and the reduction of thickness of head 160. Electrodes 146 and 246 and mounting wafer 174 are bonded into transducer units 112 with conventional adhesives. Nodal mounting wafer 174 has an annular recess 176 therein. A conventional crescent shaped retaining ring 178 is positioned in recess 176. It will be understood that the depth of recess 176 must be sufficient to permit ring 178 to deform therein during assembly of transducer unit 112 into transducer cavity 120. Nodal mounting wafer 174 must be positioned at the center point of the electroacoustic sensitive elements 52, 54, 56, and 58. Further, inasmuch as transducer units 112 are nodally mounted they are not normally secured to window 32. Heads 160 are spaced to provide a minimal operative clearance space between window 32 and heads 160. For certain applications heads 160 may be modified to be in intimate contact with window 32 but not secured thereto.

The assembly of the embodiment of the invention shown in FIGS. 1 to 5 is as follows: Transducer units 12 are assembled and bonded using conventional procedures; transducer units 12 are assembled in a holding jig to retain them in precise alignment, and are then bonded to window 32; the holding jig is removed; lead wires 62 and 64 are threaded through holes 22 into reservoir portion 18 and window 32 is bonded to forward portion 16 of housing 14. Lead wires 62 are electrically joined and lead wires 64 are electrically joined and two lead wires connected to the outside of housing 14 by insulated plug 66; resilient element 28 is positioned on and bonded to reservoir portion 18 of housing 14 and cap ring 30 threaded thereover to provide a liquid impervious seal therebetween. Plug 68 is removed and a vacuum drawn on housing 14 including all the interconnected clearance spaces; while this vacuum is maintained, liquid, such as silicone oil is supplied to fill all voids in the housing, and then plug 68 is inserted to seal the completed assembly of array 10. Any of the conventional liquids utilized to couple transducers to their associated acoustic windows may be utilized. However, for the configuration shown, an electrically insulating liquid should be used. It should be noted that the liquid surrounding each transducer unit 12 is free to flow to the adjoining transducer unit 12 through restricted interconnected minimal clearances between juxtaposed head portions adjacent the inner surface of window 32.

The assembly of the nodally mounted embodiment of the invention, as shown in FIG. 6 is as follows: A crescent shaped retaining ring 178 is assembled within recess 176 in wafer 174 of each transducer unit 112; lead wires 62 and 64 are threaded through hole 22; and this assembly is inserted into tapered forward portion 170 of cavity 120 until ring 178 is seated within annular recess 172 in housing 114. In order to assure the positive orientation of ring 178, housing 114, and unit 112, a small amount of epoxy adhesive may be applied to ring 178 and the adjacent portions of unit 112 and housing 114 during assembly to make a unitary bond, and preclude relative rotation therebetween after assembly. The electrical connection of lead wires 62 and 64, and their connection to array 110 is the same as described hereinabove with respect to array 10. After all of the transducer units 112 are assembled within housing 114, window 32 is bonded to housing 114 to form a liquid impervious seal therebetween. Head portion 160 of transducer units 112 and the inner surface of window 32 are so correlated as to provide a uniform minimal operative space therebetween to provide positive acoustic coupling. As an alternative modification, heads 160 may be positioned immediately adjacent the inner surface of window 32 without space therebetween, however the possibility of an undesirable air pocket occurring at this point makes the embodiment shown in FIG. 6 the preferred modification of nodally mounted arrays. After the bonding of window 32, array 110 is filled with liquid in a similar manner to that described for array 10 hereinabove. It should be noted that the nodal mounting of transducer units 112 is feasible in array 110 because the nodal mounting means is never stressed due to the hydrostatically compensated configuration. While the invention has been disclosed showing a plane face, the teachings thereof are equally applicable to arrays having other surface configurations, such as concave and convex. Further, the invention is useful with transducer arrays comprising a single electroacoustic sensitive element for each transducer unit, the limiting criterion being, the utilization of a plurality of substantially isolated transducer units within a sealed liquid-filled housing. While the invention is most useful with arrays having rectangular heads, as shown, it is also useful for heads of other configurations. As will be apparent, rectangular or hexagonal heads are desirable geometric configurations because the minimal operative space therebetween can be effectively reduced, thereby increasing the vibrational isolation of each fluid compensated transducer unit, and permitting the close grouping of the operationally associated transducer units of an array.

Obviously many other modifications and variations of the present invention are possible in the light of the above teachings. It is therefore to be understood that within the scope of the appended claims the invention may be practiced otherwise than as specifically described.

What is claimed is:
1. An underwater transducer array having special utility in deep ocean submergence comprising, in combination:
 (a) a massive housing of high $\rho c$ material, said housing having a forward portion, a reservoir portion, and a plurality of transducer cavities in said forward portion;
 (b) a resilient acoustic window secured to and closing said forward portion of said housing to form a liquid impervious seal therewith;

(c) an electroacoustic transducer unit positioned within each of said transducer cavities, said transducer units and said transducer cavities correlated to provide a minimal operative clearance space between each of said transducer cavities and the adjacent portions of the transducer unit positioned therewithin, each of said transducer units having a forward head portion adjacent said acoustic window, said head portions positioned to provide a minimal operative clearance space between each head portion and the head portions adjacent thereto, and said spaces between head portions interconnected to provide liquid communication therebetween adjacent said window;

(d) a resilient element secured to and closing said reservoir portion of said housing to provide a liquid impervious seal therewith;

(e) means for connecting said transducer cavities with said reservoir portion to provide liquid flow therebetween, said means for connecting comprising a conduit of small cross-sectional area adapted to function as a low-pass acoustic filter; and (f) said reservoir portion, all said minimal operative clearance spaces, and said means for connecting filled with a liquid.

2. An array in accordance with claim 1, wherein each of said transducer units has a nodal portion and said nodal portion is secured to the portion of said housing adjacent thereto.

3. An array in accordance with claim 2, wherein said head portions and said window are correlated to provide a uniform minimal operative clearance space therebetween, and said space between said head portions and said window is filled with said liquid.

4. An array in accordance with claim 3, wherein each of said transducer cavities in said housing has a tapered forward portion; and a recess adjacent said nodal portion of the transducer positioned therewithin, and each of said transducer units is secured to said housing by a retaining ring secured to said transducer unit at said nodal portion and engaged within said recess.

5. An array in accordance with claim 1, wherein each of said transducer units is directly secured to said acoustic window.

6. An underwear transducer apparatus having special utility in deep ocean submergence comprising, in combination:

a massive housing of high $\rho c$ material, said housing having a forward portion, a reservoir portion, and a transducer cavity in said forward portion;

a resilient acoustic window secured to and closing said forward portion of said housing to form a liquid impervious seal therewith;

an electroacoustic transducer unit positioned within said transducer cavity, the geometric shapes of said transducer unit and said cavity being correlated to provide a minimal operative clearance space between said transducer cavity and the adjacent portions of said transducer unit positioned therewithin, said transducer unit having a forward head portion adjacent said acoustic window and acoustically coupled therewith;

a resilient element secured to and closing said reservoir portion of said housing to provide a liquid impervious seal therewith;

a low-pass acoustic filter comprising a conduit of small cross-sectional area, said filter connecting said transducer cavity with said reservoir portion to provide liquid flow therebetween; and said reservoir portion, said minimal operative clearance space, and said means for connecting filled with a liquid.

7. Apparatus in accordance with claim 6, wherein said transducer unit is a piezoelectric unit having a nodal portion spaced from said head portion, said nodal portion being secured to the portion of said housing adjacent thereto.

8. Apparatus in accordance with claim 7, wherein said head portion of said unit and said window are correlated to provide a uniform minimal operative clearance space therebetween, and said space between said head portion and said window is filled with said liquid.

9. Apparatus in accordance with claim 8, wherein said transducer cavity in said housing has a tapered forward portion; and a recess adjacent said nodal portion of said transducer unit positioned therewithin, and said transducer unit is secured to said housing by a retaining ring secured to said transducer unit at said nodal portion and engaged within said recess.

10. Apparatus in accordance with claim 6, wherein said transducer unit is directly secured to said acoustic window.

References Cited

UNITED STATES PATENTS

| | | | |
|---|---|---|---|
| 2,406,767 | 9/1946 | Hayes | 340—10 X |
| 2,717,369 | 9/1955 | Bardeen et al. | |
| 2,787,777 | 4/1957 | Camp | 340—10 |
| 2,897,475 | 7/1959 | Harris | 340—9 X |
| 2,961,637 | 11/1960 | Camp | 340—10 |
| 3,199,071 | 8/1965 | Massa | 340—10 |

RODNEY D. BENNETT, *Primary Examiner.*

B. L. RIBANDO, *Assistant Examiner.*